United States Patent [19]

Baumeister

[11] Patent Number: 4,774,599
[45] Date of Patent: Sep. 27, 1988

[54] SKIP-FIELD VIDEO RECORDING WITH MAXIMUM VERTICAL RESOLUTION

[75] Inventor: Hans-Peter Baumeister, Churchville, N.Y.

[73] Assignee: Eastman Kodak Company, Rochester, N.Y.

[21] Appl. No.: 292

[22] Filed: Jan. 2, 1987

[51] Int. Cl.⁴ ............................................. H04N 5/78
[52] U.S. Cl. .................................. 360/11.1; 360/35.1; 358/335
[58] Field of Search .................... 360/10.3, 11.1, 35.1, 360/10.1; 358/313, 335

[56] References Cited

U.S. PATENT DOCUMENTS

| | | | |
|---|---|---|---|
| 3,509,273 | 4/1970 | Kahara | 360/35.1 |
| 3,999,218 | 12/1976 | Iyama et al. | 360/35.1 X |
| 4,403,250 | 9/1983 | Kellar | 360/35.1 X |
| 4,641,202 | 2/1987 | Nukamura et al. | 358/313 |

Primary Examiner—Aristotelis M. Psitos
Attorney, Agent, or Firm—Robert M. Wallace

[57] ABSTRACT

By employing field store memories, a skip-field video recorder records odd and even fields of different frames and then plays back full frames reconstructed from the recorded odd and even fields, thus achieving maximum vertical resolution in the playback video image.

5 Claims, 3 Drawing Sheets

SKIP-FIELD VIDEO RECORDING WITH MAXIMUM VERTICAL RESOLUTION

BACKGROUND OF THE INVENTION

1. Technical Field

The invention is related to skip-field video cassette recorders in which the required tape speed is reduced by a factor of two for a given signal bandwidth.

2. Description of Related Art

U.S. patent application Ser. No. 908,750, filed Sept. 18, 1986 by Hans-Peter Baumeister et al. and entitled "ZERO GUARD-BAND SKIP-FIELD VIDEO CASSETTE RECORDER" describes (among other things) a skip-field video recorder in which the missing fields in the playback signal are filled in by playing each field twice during playback. Various related signal processing techniques are known in the art, for averaging, interpolating or repeating video signals, as disclosed in U.S. Pat. Nos. 4,298,896; 4,393,414; 3,886,589; 4,348,689; 3,470,315; and 3,944,728.

Skip-field video recording is plagued by the limitation that the vertical resolution of a playback skip-field video signal is significantly reduced. This is because the "skipped" fields must be filled in by repeating or interpolating previously recorded video fields. If only even video fields, for example, are recorded, then the information in the horizontal video lines of the odd video fields is permanently lost, thus reducing the vertical image resolution (number of horizontal video lines) by a factor of two. Simply repeating a video field twice during playback to fill in for a skipped field does not recover the lost information and therefore does not really improve the vertical resolution. Even the technique of interpolating between adjacent horizontal lines of a given video field does not really provide the "missing" information of the skipped field. Apparently, no practical technique is known for achieving full vertical resolution in a skip-field video recorder. It is an object of the present invention to overcome this limitation.

SUMMARY OF THE INVENTION

The skip-field video recorder of the present invention provides a full vertical resolution playback video signal. During recording, field store memories store individual fields of an incoming video signal to be recorded. What is recorded in accordance with the invention comprises only the even fields of even numbered frames and only the odd fields of odd numbered frames, in one embodiment. The field store memories store these particular fields of the incoming video signal, and then transmit them, in sequence, to the video recorder for skip-field recording. In one embodiment, the stored video signals are read out of memory at a data rate equal to one half that at which they were written into memory. A single head may be used to record the video signal while the video tape is transported around the drum at half the standard tape speed, as described in the referenced patent application of Baumeister et al. During playback, the skip-field video signal picked up from the tape by the heads is written into the field store memories. Each field is then read out twice to an output node. In this manner, the "skipped" fields are filled in during playback by repetition. More importantly, full vertical resolution is achieved by reading out odd and even fields of different frames as the odd and even fields, respectively, of each frame of the playback video signal. Thus, each frame of the playback video signal comprises a previously recorded odd video field of one frame and a previously recorded even video field of a different frame. Accordingly, at least nearly full vertical resolution is achieved during playback (with some attendant loss of temporal sampling rate).

BRIEF DESCRIPTION OF THE DRAWINGS

The invention may be understood by reference to the accompanying drawings, of which.

DETAILED DESCRIPTION

Record Mode

Figure 1:
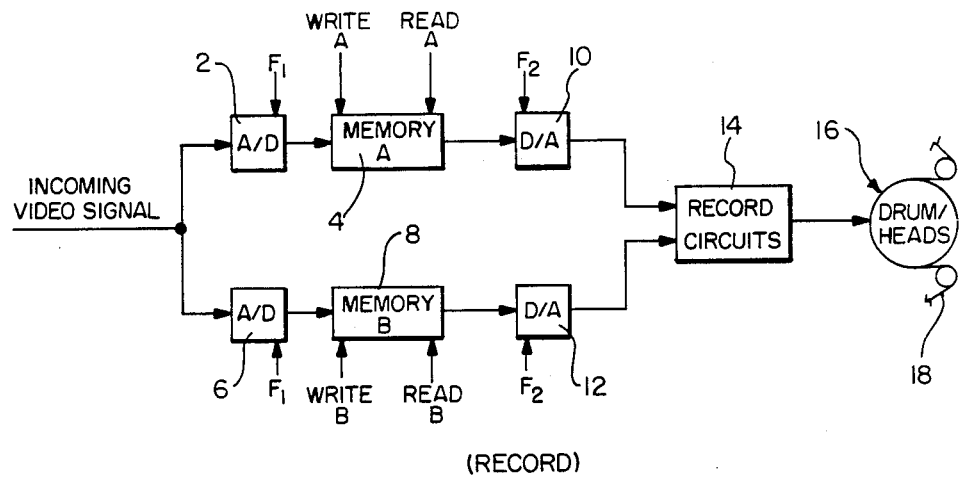
FIG. 1 is block diagram illustrating the preferred embodiment of the invention configured in the record mode.

Referring to FIG. 1, the even fields of even numbered frames of an incoming video signal are sampled at a first frequency $F_1$ by an analog-to-digital converter 2, and the resulting string of digital words is written into a field store memory 4 at a data rate corresponding to the frequency $F_1$. In the meantime, the odd fields of odd numbered frames of the incoming video signal are sampled at the frequency $F_1$ by another analog-to-digital converter 6, and the resulting string of digital words is loaded into a field store memory 8 at the frequency $F_1$. The video fields so loaded into the field store memories 4 and 8 are read out sequentially at a second frequency $F_2$ (equal to half the frequency $F_1$) through digital-to-analog converters 10, 12, respectively. Thus, an odd video field would be read out from the memory 4 through the digital-to-analog converter 10 and then an even video field would be read out from the memory 8 to the digital-to-analog converter 12. The data read out from the memories 4, 8 are converted by the digital-to-analog converters 10, 12 to analog signals which are transmitted to record circuits 14 (of the type well-known in the art) and thence to a helical scan video tape recording system 16 (including a rotary drum having record heads which record the signals on a video tape 18 in the well-known manner). Because the frequency $F_2$ at which the video signals are fed to the record circuits 14 is half the frequency $F_1$ at which the incoming video signal sampled, the video tape 18 may be transported at half its usual speed with no appreciable loss of bandwidth, thus raising the effective storage capacity of the tape 18 by a factor of 2, a significant advantage.

The most significant advantage of the system of FIG. 1 is that skip-field video recording is accomplished while recording the video signals of both odd and even video fields. Accordingly, enough information is preserved to reconstruct full-frame playback video signals having a vertical image resolution at least nearly as great as that of the original incoming video signal.

Figure 3:
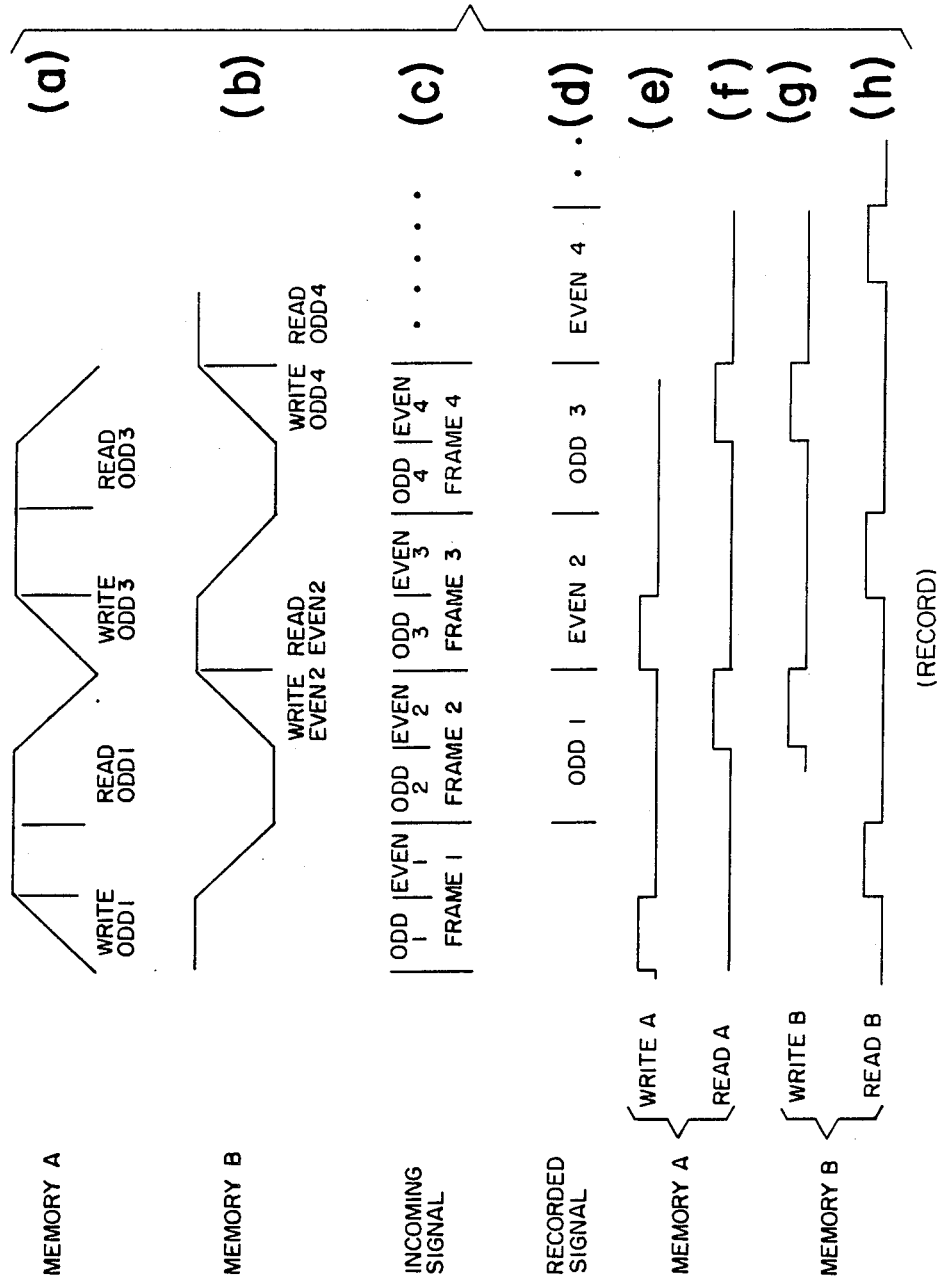
FIG. 3 includes contemporaneous timing diagrams illustrating the recording operation of the embodiment of FIG. 1.

The record operation performed by the embodiment of FIG. 1 may be understood by reference to FIG. 3. FIG. 3a shows that the odd fields are written into the memory 4 ("memory A") at a high frequency and are then read out at a lower frequency. FIG. 3b shows that the incoming even fields are written into the memory 8

("memory B") at the higher frequency and are then read out of that memory at the lower frequency. The incoming video signal is depicted in FIG. 3c. FIG. 3d shows that the portion of the incoming signal which is actually recorded on the tape 18 comprises only odd fields from odd numbered video frames and only even video fields from even numbered video frames, in this particular embodiment. (Of course, it will be recognized that various other schemes are possible, such as recording only the odd fields of even numbered video frames and the even fields of odd numbered video frames, for example.)

Reading and writing in each of the memories 4, 8 ("memory A" and "memory B") is governed by memory read and write signals WRITE A, READ A; and WRITE B, READ B, respectively, illustrated in FIGS. 3e through h. These signals synchronize the writing and reading in each of the memories in accordance with FIGS. 3a and b.

Playback

Figure 2:
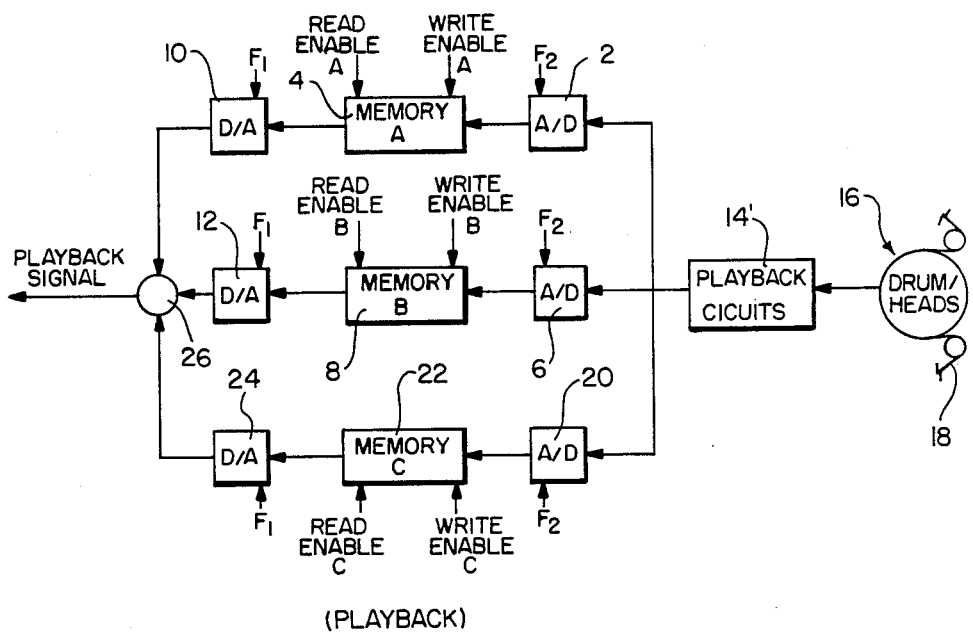
FIG. 2 is a block diagram of the preferred embodiment of the invention configured in the playback mode.

A playback video signal is generated by the embodiment of FIG. 2 from a skip-field video signal previously recorded in the foregoing manner. The embodiment of FIG. 2 includes field store memories 4, 8, the analog-to-digital converters 2, 6, the digital-to-analog converters 10, 12, the helical-scan video recording system 16 and the video tape 18. In addition, playback circuits connected between the video recording system 16 and the analog-to-digital converters 2, 6 may share components in common with the record circuits 14 of FIG. 1. The embodiment of FIG. 2 includes, in addition, a third field store memory 22 ("memory C"), a third analog-to-digital converter 20 and a third digital-to-analog converter 24.

The key to the playback system of FIG. 2 is that different fields played back by the recording system 16 are stored in different ones of the field store memories 4, 8, 22 for at least the duration of one video frame, and each of them is read out of memory twice before being replaced by a subsequent field. The sequence in which the different fields are read out of the field store memories 4, 8, 22 is such that each even field read out from any one of the memories is followed by an odd field read out from another one of the memories 4, 8, 22 (or vice versa in another embodiment).

The video fields are read out from the memories 4, 8, 22 at the frequency $F_1$ so as to be compatible with standard composite video formats such as the NTSC format. The video signals read out from the memories 4, 8, 22 are then converted to analog form at the frequency $F_1$ by the digital-to-analog converters 10, 12, 24, respectively, and transmitted to an output node 26. The playback signal thus reconstructed at the output node 26 has full vertical resolution, at least nearly equal to that of the original incoming video signal (despite the fact that the recorded signal from which the playback signal at the output node 26 has been reconstructed comprises only a skip-field video signal, in which half the information is "missing"). This is possible because each frame of the playback video signal at the output node 26 comprises (1) an odd field corresponding to a previously recorded odd field of one frame and (2) an even field corresponding to an even field of another previously recorded frame.

This result should be contrasted with prior systems in which, typically, only even (or odd) video fields are recorded so that, even though each recorded field may be repeated twice to "fill-in" for the skipped video fields, the reconstructed playback signal lacks the information corresponding to the odd (or even) horizontal lines of the original incoming video signal. Thus, it has seemed that the vertical resolution could never exceed more than one-half of the vertical resolution of the original incoming video signal.

The present invention reconstructs a playback signal from a skip-field recorded signal by using information from both odd and even horizontal lines of the original incoming video signal. The only disadvantage is that the odd and even video fields of the reconstructed playback signal of this invention may be offset from one another in time by an entire video frame. This can create undesirable visible artifacts in the reconstructed playback image, but only in those instances when the original incoming video signal contains very rapid motion. In such instances, it may be desirable to select (on a pixel-by-pixel basis) between the playback process implemented by the embodiment of FIG. 2 and a prior art playback process, thus trading off resolution against motion stability in the reconstructed playback image of the skip-field video recorder. Alternatively, in such instances, an averaging process, to be described later herein, may be selected (on a pixel-by-pixel basis) to avoid motion artifacts.

Figure 4:
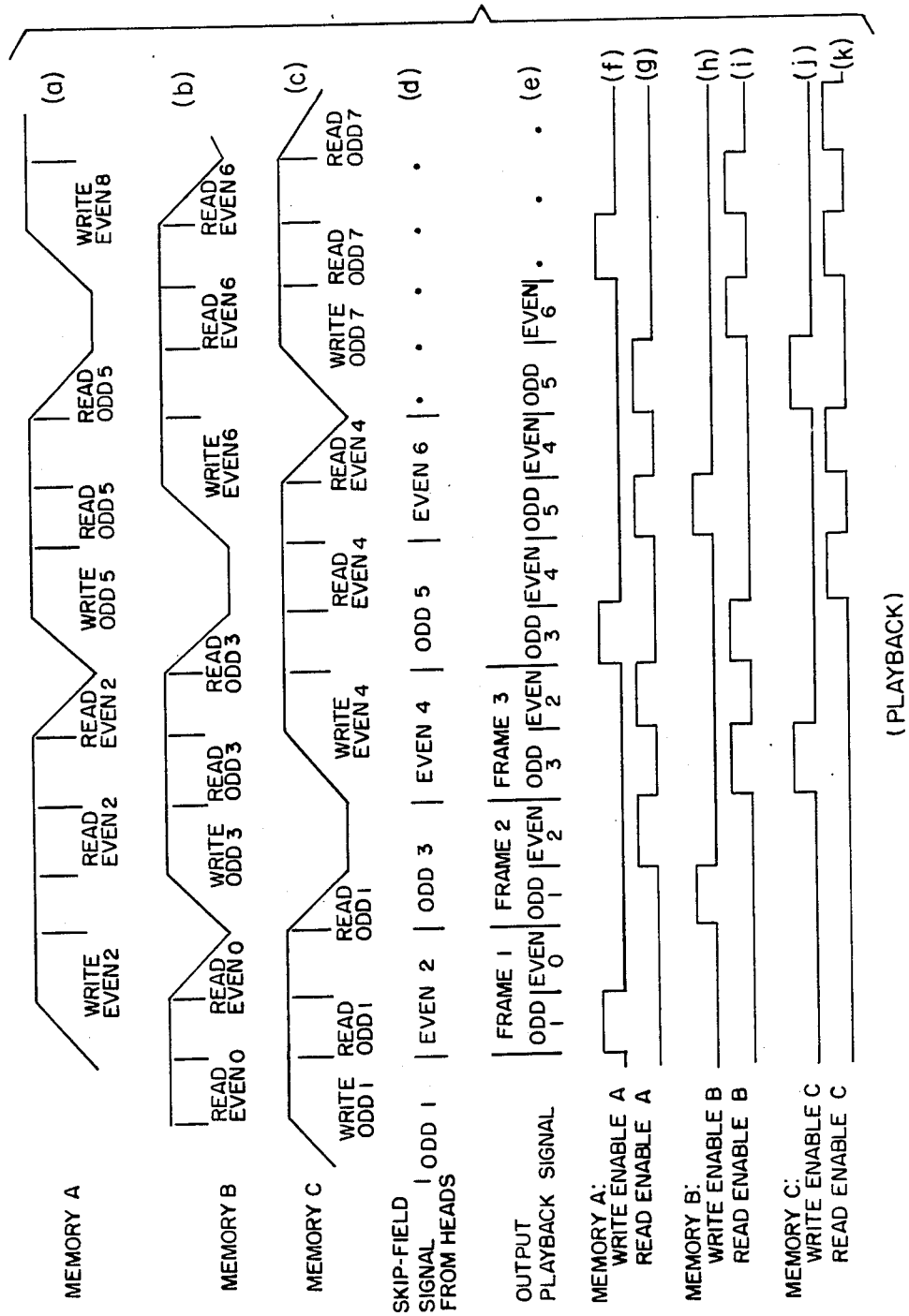
FIG. 4 includes contemporaneous timing diagrams illustrating the playback operation of the embodiment of FIG. 2.

Operation of the embodiment of FIG. 2 may be understood by reference to FIG. 4. FIG. 4 shows that the tasks of storage and time-compression of each of the video fields played back from the tape 18 are shared equally among the memories 4, 8, 22 (memories A, B, C) on a round-robin basis. FIG. 4d (corresponding FIG. 3d) illustrates the skip-field recorded video signal. Memory C stores the odd field of frame 1, memory A stores the even field of frame 2 and memory B stores the odd field of frame 3, etc. Each of the stored fields is read out twice from each of the memories before being erased and replaced by a subsequent field, so as to generate a full-frame output playback video signal illustrated in FIG. 4e. Frame 1 of the reconstructed playback signal comprises the odd field of the original frame 1 and the even field of the original frame 0. Frame 2 of the reconstructed playback signal comprises the odd field of original frame 1 and the even field of original frame 2.

Reading and writing in each of the memories 4, 8, 22 is governed by WRITE ENABLE and READ ENABLE logic signals illustrated in FIGS. 4f through k. Thus, reading and writing in memory A is governed by WRITE ENABLE A and READ ENABLE A logic signals, in memory B by WRITE ENABLE B and READ ENABLE B logic signals and in memory C by WRITE ENABLE C and READ ENABLE C logic signals, respectively. These signals individually reach "high" logic levels in synchronism with the sequence of read and write operations illustrated in FIGS. 4a, b and c in accordance with the foregoing playback operation.

In those instances during which the playback signal contains high speed motion, the following averaging technique—referred to previously herein—may be employed to reduce high speed motion artifacts in the reproduced image. Referring to FIG. 4e, in those reproduced frames wherein the later of the two interlaced fields was earlier in time in the originally recorded signal (i.e., frame No.'s 1, 3, 5, etc.), the out-of-sequence field is discarded in favor of an average field reconstructed by interpolating between the first field of the present playback frame and the first field of the next frame. For example, frame 3 of FIG. 4e comprises, in chronological order, odd field 3 followed by even field 2. Since even field 2 represents a step backwards in time with respect to odd field 3, discarding even field 2 reduces the risk of visible high speed motion artifacts. In its place, what is played back is an interpolation between adjacent lines of odd field 3.

Of course, it should be recognized that the sequence illustrated in FIG. 4, as well as the configuration illustrated in FIG. 2, is but one of several embodiments of the invention which a worker of skill in this art may readily implement in accordance with the teachings of this specification. For example, during recording, the selection of an even or odd field by frame number may be different from that illustrated in FIG. 4. Furthermore, the number of memories may be reduced by employing dual port memories of the type described, for example, in U.S. patent application Ser. No. 902,821, filed Sept. 2, 1986 by Steven J. Sasson entitled "DUAL PORT TIME-DIVISION VIDEO MULTIPLEXER" or by other techniques. In any such alternative embodiment, the advantages of the invention are realized by skip-field recording both odd and even video fields of different incoming video frames and then, during playback, reconstructing a playback video signal of which each frame comprises an odd field of one frame of the originally recorded signal and an even field of another frame of the originally recorded signal, to achieve full vertical resolution.

While the invention has been described in detail with particular reference to preferred embodiments thereof, it is understood that various modifications thereof may be made within the spirit and scope of the invention.

What is claimed is:

1. A skip-field video recorder having high playback image resolution, said recorder adapted to receive a video tape, said recorder comprising:
    means including a magnetic head for helically scanning individual tracks on said tape for recording or playing back individual video fields in individual ones of said tape tracks;
    first means for receiving an incoming video signal characterized by an incoming video field rate, said signal including successive video frames wherein each of said frames comprises an odd video field and an even video field interlacable together, said receiving means being adaptable to transmit only the odd fields of certain ones of said frames to said scanning means and to transmit only the even fields of other ones of said frames to said scanning means for recording on said tape; and
    second means for receiving a video signal played back from said tape tracks by said scanning means, for storing each individual field of said playback video signal, and for sequentially transmitting—during a given playback frame time interval—a video signal of successive video frames comprising, in sequence, an odd field of one frame of said incoming video signal and an even field of another frame of said incoming video signal, whereby said tape is transportable through said helical scanning means at a speed reduced from a given standard tape speed without a corresponding reduction in bandwidth, while each frame of said video signal transmitted by said second receiving means has an apparent vertical resolution greater than a single video field and at least nearly equal to that of said incoming video signal.

2. A skip-field video recorder having high playback image resolution, said recorder adapted to receive a video tape, said recorder comprising:
    means including a magnetic head for helically scanning individual tracks in said tape for recording or playing back individual video fields in individual ones of said tape tracks; and
    means for receiving an incoming video signal characterized by an incoming field rate, said video signal including successive video frames wherein each of said frames comprises an odd video field and an even video field interlaced together, said receiving means being adaptable to transmit only the odd fields of certain ones of said frames to said scanning means and to transmit only the even fields of other ones of said frames to said scanning means for recording on said tape, whereby substantially all horizontal lines of said incoming video signals are recorded, albeit from different frames, including those lines comprising odd video fields and those lines comprising even video fields, whereby to preserve the corresponding information of said incoming video signal.

3. A skip-field video recorder having high playback image resolution, said recorder adapted to receive a video tape, said recorder comprising:
    means for recording odd fields of alternate frames and even fields of remaining frames of incoming video signal in individual respective tracks on said video tape; and
    playback means comprising:
        means for picking up video signals previously recorded on said video tape,
        means for storing each field of said video signal so picked up from said video tape, and
        means for retrieving from said storing means and transmitting, during respective playback frame times, an odd video field corresponding to one frame of said previously recorded video signal, and an even field corresponding to another frame of said previously recorded video signal, whereby the video signal transmitted by said transmitting means is characterized by an enhanced vertical resolution.

4. The skip-field recorder of claims 1 or 3 wherein said transmitting means transmits each of the stored video fields twice during playback, whereby each video field is separately combined with the even fields corresponding to different video frames of the originally incoming video signal in the course of reconstructing two playback video frames from the skip-field recorded video signal.

5. The video recorder of claim 1 or 3 wherein said means for storing and transmitting comprise three separate field store memories adapted to receive and store, in sequence, successive video fields played back from said tape, whereby an odd field and an even field is sequentially read out from a respective one of said memories in sequence to reconstruct each frame of a playback video signal from the skip-field recorded video signal, wherein each video field stored in one of said three memories is transmitted twice therefrom before being replaced in said memory by the next video field to be stored therein, whereby to generate a continuous sequence of odd and even video fields to achieve an apparent full vertical resolution in a playback video image transmitted by said storing and transmitting means.

* * * * *